United States Patent [19]
Perilloux et al.

[11] Patent Number: 5,151,917
[45] Date of Patent: Sep. 29, 1992

[54] LASER RESONATORS EMPLOYING DIFFRACTIVE OPTICAL ELEMENTS

[75] Inventors: Bruce Perilloux, Grass Valley; Arnold Bloom, Menlo Park; Dennis Fischer, Auburn; Larry Giammona, Grass Valley; Thomas F. Johnston, Auburn, all of Calif.

[73] Assignee: Coherent, Inc., Palo Alto, Calif.

[21] Appl. No.: 687,334

[22] Filed: Apr. 18, 1991

[51] Int. Cl.$^5$ ............................................. H01S 3/08
[52] U.S. Cl. ................................... 372/102; 372/93; 372/97; 372/99; 372/101
[58] Field of Search ................... 372/99, 102, 101, 93, 372/97

[56] References Cited

U.S. PATENT DOCUMENTS

| | | | |
|---|---|---|---|
| 4,846,552 | 7/1989 | Veldkamp et al. | 350/162.2 |
| 4,895,790 | 1/1990 | Swanson et al. | 430/321 |
| 4,933,649 | 6/1990 | Swanson et al. | 330/4.3 |
| 5,013,133 | 5/1991 | Buralli et al. | 350/162.11 |
| 5,027,359 | 6/1991 | Leger et al. | 372/108 |
| 5,033,060 | 7/1991 | Leger et al. | 372/97 |

OTHER PUBLICATIONS

T. Shiono & K. Setsune, "Blazed Reflection Micro-Fresnel Lenses Fabricated by Electron-Beam Writing and Dry Development," *Optics Letters*, vol. 15, No. 1, Jan. 1, 1990, pp. 84–86.

T. Shiono, K. Kitagawa, K. Setsune, & T. Mitsuyu, "Reflection Micro-Fresnel Lenses and Their Use In An Integrated Focus Sensor," *Applied Optics*, vol. 28, No. 15, Aug. 15, 1989, pp. 3434–3442.

J. Jahns & S. J. Walker, "Two-Dimensional Array of Diffractive Microlenses Fabricated By Thin Film Deposition," *Applied Optics*, vol. 29, No. 7, Mar. 1, 1990, pp. 931–936.

G. J. Swanson & W. B. Veldkamp, "Diffractive Optical Elements for Use In Infrared Systems," *Optical Engineering*, vol. 28, No. 6, Jun. 1989, pp. 605–608.

Booklet, "Design Approaches for Diffractive Optics," Monday, Jun. 11, 1990, containing 3 articles: 1. M. W. Farn & J. W. Goodman, Diffractive Doublet Corrected On-Axis at Two Wavelengths, Stanford University, pp. LMB2-1 through LMB2-2; 2. C. Londono & P. P. Clark, Achromatized Hybrid Diffractive Lens Systems, Polaroid Corporation, pp. LMB3-1 through LMB3-2; 3. W. H. Southwell, Binary Optics From a Raytracing Point of View, Rockwell International Science Center, pp. LMB4-1 through LMB4-2.

Booklet, "Applications of Diffractive Optics," Tuesday, Jun. 12, 1990, containing 2 articles: 1. D. A. Buralli & G. M. Morris, "Design of Two- and Three-Element Diffractive Telescopes," Institute of Optics, Univ. of Rochester, pp. LTuD1-1 through LTuD1-2; 2. A. D. Kathman & S. K. Pitalo, "Binary Optics in Lens Design," Teledyne Brown Engineering, pp. LTuD2-1 through LTuD2-2.

J. A. Cox, "Binary Optics Offers New Freedom to System Designers," *Laser Focus World*, Aug. 1989, pp. 47, 51–52.

J. Hecht, "'Binary' Optics Emerging From Labs," *Laser & Optronics*, May 1990, pp. 16, 21, 24, 26.

*Primary Examiner*—James W. Davie
*Attorney, Agent, or Firm*—Limbach & Limbach

[57] ABSTRACT

A laser 10 is disclosed in which there are incorporated one or more diffractive optical elements (DOE's) 20. The DOE's can be used in place of conventional optics to save costs and allow design of resonators not heretofore possible. The ability to vary the reflectivity of the surface of a DOE in any desired pattern allows unprecedented control of both the intracavity mode as well as the mode of the output beam.

26 Claims, 6 Drawing Sheets

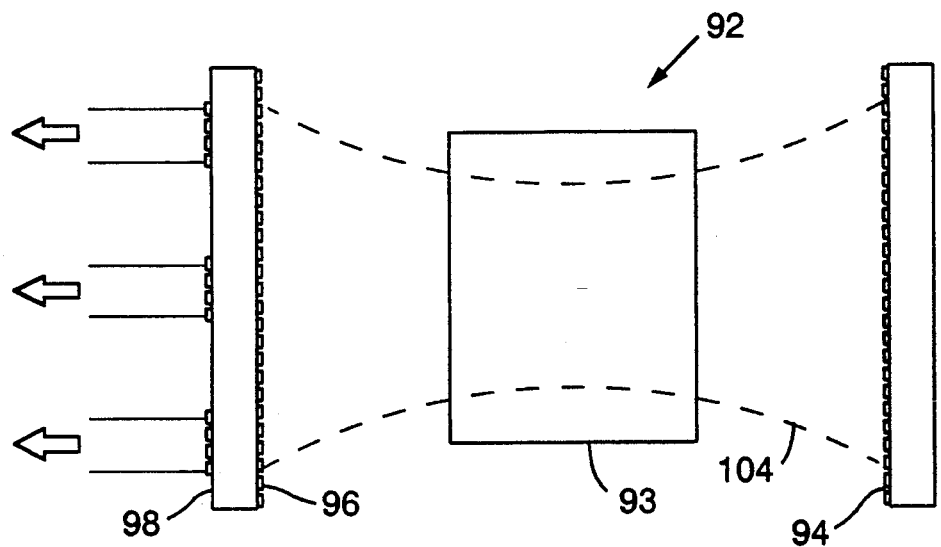
FIG. 11
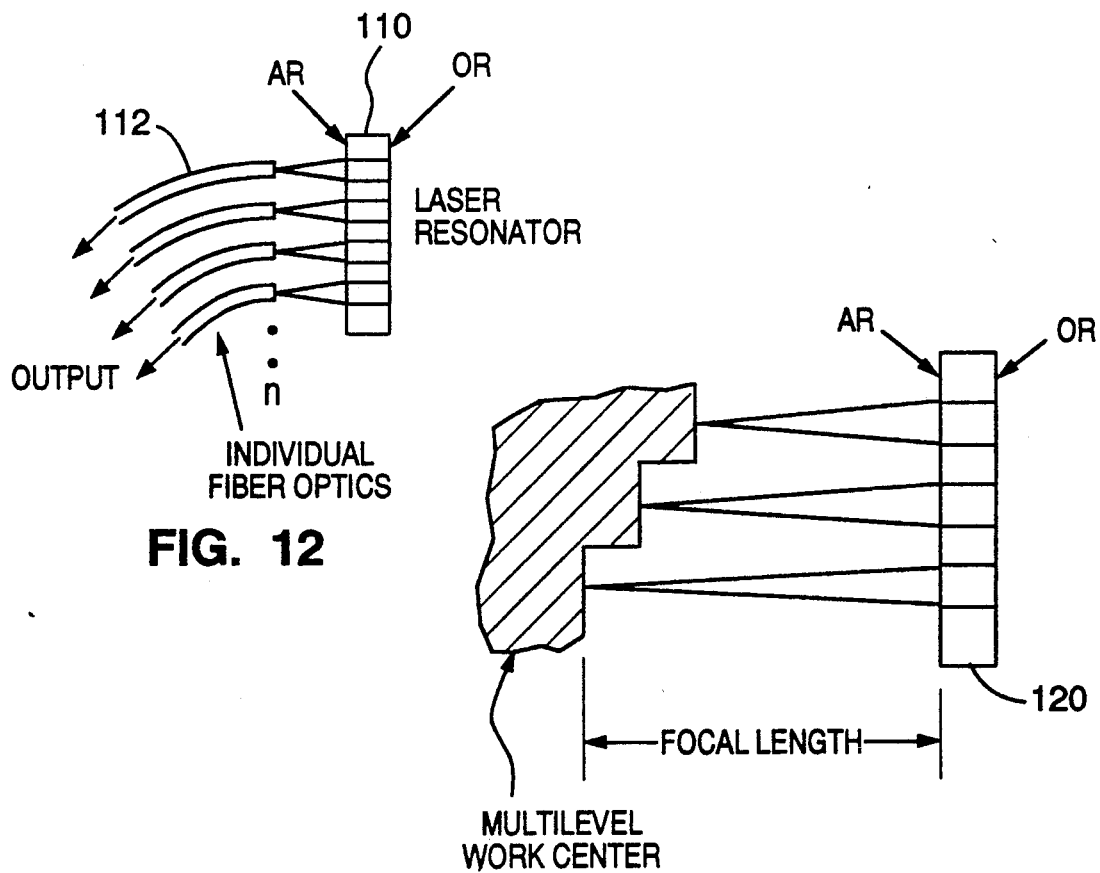
FIG. 12
FIG. 13

LASER RESONATORS EMPLOYING DIFFRACTIVE OPTICAL ELEMENTS

TECHNICAL FIELD

The subject invention relates to applications for diffractive optical elements in the design of laser resonators.

BACKGROUND OF THE INVENTION

Within the last few years there has been great interest in the use and application of binary or diffractive optical elements (DOE's). A DOE is created by etching microscopic patterns on the surface of a substrate. The edges of the patterns diffract light. With the proper design, the DOE can be used like a standard refractive lens to focus light.

The fabrication steps used in creating various DOEs are known in the art. See, for example, the disclosure in U.S. Pat. Nos. 4,846,552 and 4,895,790 both incorporated herein by reference. An alternative fabrication technique is disclosed in copending application Ser. No. 07/479,474 filed Feb. 13, 1990.

The steps used to construct a DOE are similar to semiconductor fabrication techniques. In fact, off-the shelf semiconductor photomask and etching equipment can be used. A computer program is used to calculate the configuration of the photomasks. The efficiency of the optic is improved as the number of masking and etching steps is increased.

Now that the theory and technology related to DOE's has been demonstrated, there is significant interest in developing a wide range of applications for the devices. It has been reported that DOE's are being incorporated into bifocal implants used for cataract patients. Another commonly cited application is the addition of a DOE surface to a standard spherical lens to correct for chromatic aberrations. As is well known, standard refractive lenses will focus different wavelengths of light at different locations. In the prior art, such chromatic errors were corrected using additional lenses. In contrast, chromatic aberrations can be corrected in a single lens by etching a properly designed DOE pattern on the surface of a refractive lens.

In the prior art there has also been discussions relating to the use of DOE's with lasers. Due to their lightweight and relatively low cost, DOE's have been suggested as replacements for lenses in compact disc players for focusing the beams from laser diodes. In addition, a DOE can be used to shape a laser beam after it has been emitted from the laser. For example, U.S. Pat. No. 4,933,649 teaches that the side lobes of a laser diode array can be suppressed by using a DOE in a corrective optical system.

Up to this time, there has been no detailed study regarding integrating DOE's into a laser resonator. Beyond the obvious appeal of lower costs, a number of added benefits can be realized if a DOE is incorporated into the design of a laser resonator.

Accordingly, it is an object of the subject invention to provide a laser utilizing a diffractive optical element.

It is a further object of the subject invention to provide a laser wherein a DOE is formed integrally with one or more end mirrors of a laser resonator.

It is another object of the subject invention to provide a laser wherein a DOE is formed integrally with the gain medium.

It is still a further object of the subject invention to provide a laser wherein a DOE is used to control the shape of the transverse mode of the circulating laser beam.

It is still another object of the subject invention to provide a laser wherein a DOE is used to control the shape of the transverse mode of the laser beam emitted from the cavity.

It is still another object of the subject invention to provide a laser with a DOE formed on a radiused optic.

It is still another object of the subject invention to provide a laser with a DOE in combination with multilayer stacks configured for applications such as antireflection or wavelength selection.

SUMMARY OF THE INVENTION

In accordance with these and other objects, the subject invention provides for a laser having a resonant cavity. The resonant cavity is typically defined by a pair of end mirrors, one of which functions as the high reflector and the other functions as the output coupler.

A gain medium is located within the resonant cavity. A means is provided for exciting the gain medium to generate a laser beam.

In accordance with the subject invention, a diffractive optical element is formed integrally with the laser to vary the path of the laser beam. The DOE can be formed on a separate optical element within the resonator or integrally with the gain medium or resonator optics. The DOE can be used to control the characteristics of the transverse mode of the laser beam either in the cavity or as it exits the cavity.

There are a number of unique advantages which can be achieved through control of the transverse mode of the beam. For example, the shape of the mode can be tailored to maximize the extraction of energy from the gain medium. The DOE can also be configured to limit the output of the laser to best match the profile of the fundamental mode. The DOE can also be used to create multiple beams either circulating within the laser or emitted from the output coupler.

The DOE can be combined with various multilayer coatings to gain additional advantages. For example, the DOE can be used to create multiple internal resonant cavities and wavelength selective coatings can be used so that each cavity emits a different wavelength.

Further advantages of the subject invention will become apparent from the following detailed description taken in conjunction with the drawings in which:

BRIEF DESCRIPTION OF THE DRAWINGS

FIG. 11 is a schematic illustration of a DOE formed on an output coupler and configured to split a the main circulating beam into multiple output beams.

FIG. 12 illustrates how the DOE of FIGS. 10 or 11 can be used to inject multiple beams into individual optical fibers.

FIG. 13 illustrates how the DOE of FIGS. 10 or 11 can be used to focus multiple beams at different locations on a work piece.

DETAILED DESCRIPTION OF THE PREFERRED EMBODIMENTS

Figure 1:
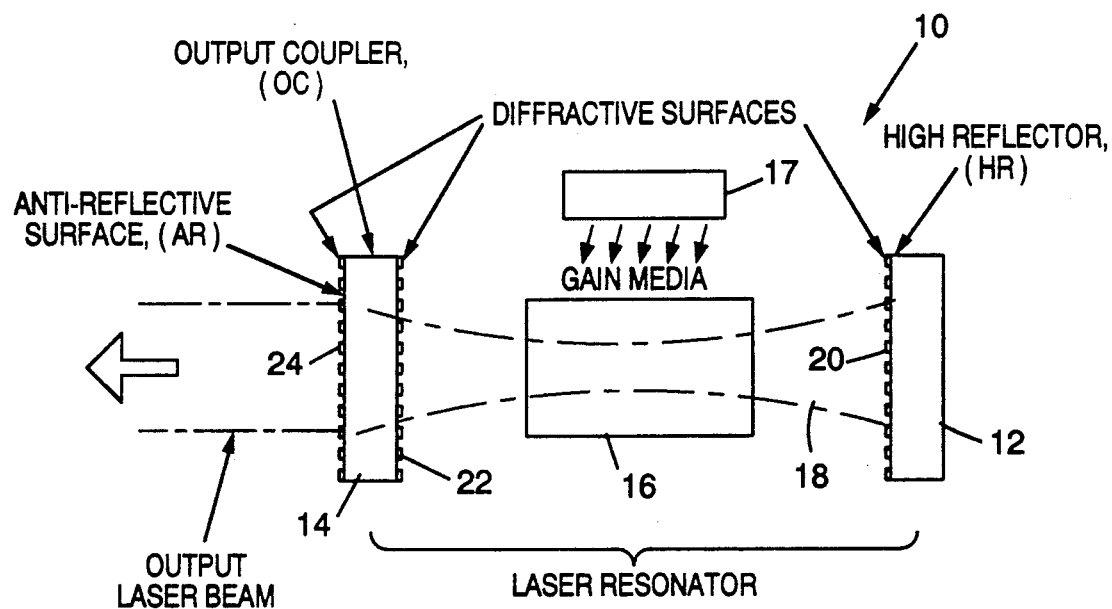
FIG. 1 is a schematic view of laser incorporating diffractive optical elements integral with the resonator elements.

Turning to FIG. 1, there is illustrated a basic laser 10 incorporating diffractive optical elements (DOE's) into the resonator structure. Laser 10 includes a resonant cavity defined by a pair of end mirrors 12 and 14. End mirror 12 is a high reflector and end mirror 14 is partially transmissive to the laser wavelength and defines the output coupler.

A gain medium 16 is located within the resonant cavity. As means 17, such as a flashlamp, is provided to excite the gain medium so that a circulating laser beam 18 is generated in the cavity.

In accordance with the subject invention, one or more DOE surfaces are provided in the laser 10. FIG. 1 illustrates three DOE surfaces. The first DOE 20 is formed on the inner surface of the high reflector. A DOE 22 is also provided on the inner surface of the output coupler 14. Finally, a DOE 24 is formed on the outer surface of the output coupler 14.

Figure 2:
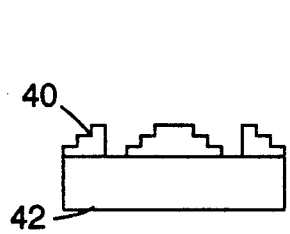
FIG. 2 is a schematic side view of illustrating the type of pattern that would be etched on a substrate to create a diffractive optical element.

As noted above, the techniques for forming DOE's on both planar and curved surfaces are known in the art. FIG. 2 illustrates the microscopic profile of a DOE pattern 40, in a simplified schematic form. The DOE pattern 40 is shown formed on a planar substrate 42. The height of the pattern is on the order of 0.5 to 1.0 microns. The DOE pattern consists of a number of steps, where the edges of each step diffract light. By carefully controlling the pattern, the DOE will function like a lens. The efficiency of the optic is improved by increasing the number of steps. With present technology, the use of four masking and etching steps can produce DOE's with close to ninety-nine percent efficiency. Such high levels of efficiency are desirable to avoid unacceptable losses within the resonator.

Unlike a standard refractive lens which has a single focal power, different regions on the surface of the DOE can be easily fabricated with different focal effects. As will be seen below, this capability will allow the design of novel resonators having arbitrary mode patterns.

Figure 3:
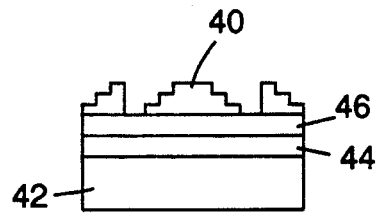
FIG. 3 is a view similar to FIG. 2 further illustrating how a multilayer stack could be formed between the substrate and the diffractive optical pattern.

The DOE can also be used in combination with conventional multilayer thin film interference coatings. FIG. 3 illustrates a substrate 42 upon which has been applied a multilayer thin film stack 44. The stack might be designed to control the transmission of certain wavelengths. An optically thick layer 46 is coated over the stack. Layer 46 would be formed from a material selected such that it will not effect the transmission characteristics of the stack. The DOE pattern 40 can then be etched into layer 46.

Figure 4:
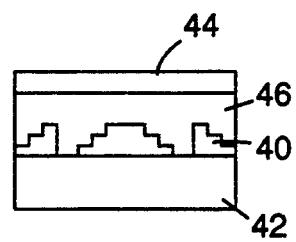
FIG. 4 is a view similar to FIG. 3 showing how a multilayer stack can be added on top of a diffractive optical pattern.

FIG. 4 illustrates an alternative approach wherein the DOE pattern 40 is etched into the substrate 42. An optically thick layer 46 is added over the DOE pattern. Layer 46 would have an index of refraction selected to maintain the efficiency of the DOE. A multilayer thin film interference stack 44 is then added on top of layer 46. The construction approach in FIG. 4 might be used if stack 44 is for antireflection purposes.

FIG. 1 illustrates some of the locations where a DOE optical element can be integrated into a laser resonator. In any given resonator there can be one or more DOE's. These DOE's can be of the basic type shown in FIG. 2 or in combination with other optical coatings as shown in FIGS. 3 through 5.

In its basic form, DOE's could be used as straight replacements for the standard radiused optics used to define a conventional resonator. The term standard radiused optic is intended to refer to curved optical elements for focusing light through reflection or refraction. One advantage to substituting DOE's for conventional optics is that the DOE elements can be mass produced at lower costs than conventional optics.

In the laser illustrated in FIG. 1, DOE surfaces 20 and 22 can be used to define the resonator and DOE surface 24 can be used to collimate or focus the output beam. Any one of the standard optical focusing elements of a laser resonator is a candidate for replacement by a DOE surface.

Figure 5:
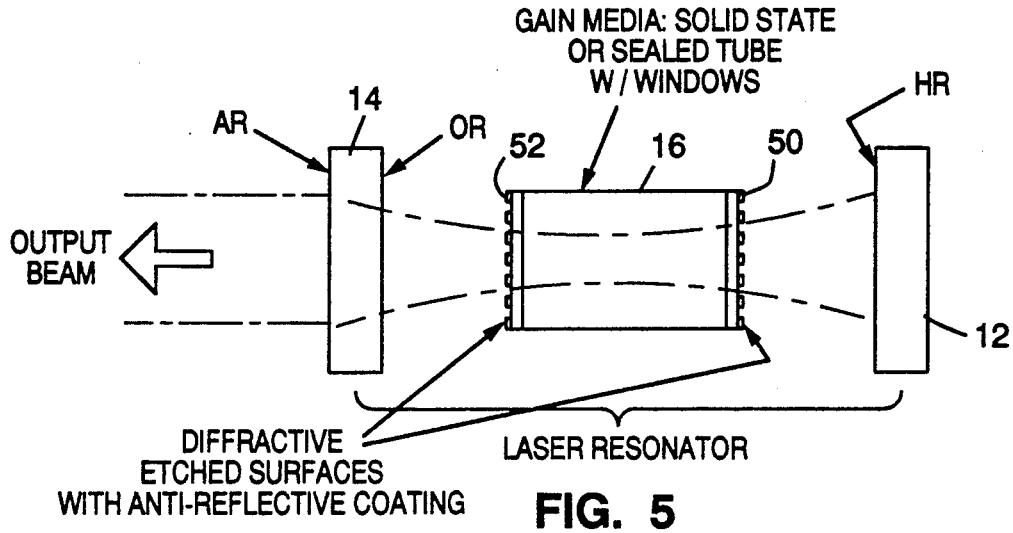
FIG. 5 is a schematic view of a laser wherein DOE's are formed integrally on the gain medium.
Figure 6:
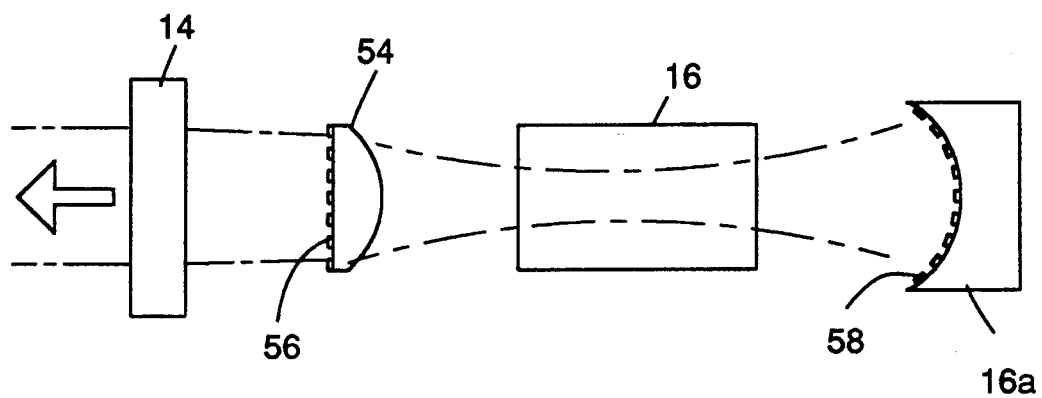
FIG. 6 is a schematic view of a laser illustrating the formation of a DOE on a reflective element and on a separate refractive element.

FIGS. 5 and 6 illustrate other locations in the resonator where a diffractive pattern might be utilized. In FIG. 5, diffractive patterns 50 and 52 are etched directly onto one or both of the opposed planar end surfaces of the gain medium. The schematic illustration of FIG. 5 could also represent DOE's placed on the windows of a sealed gas laser tube.

FIG. 6 illustrates that a DOE can be formed on a separate element 54 located in the cavity. In this case, element 54 is a standard planoconvex refractive lens on which the diffractive pattern 56 has been etched on the planar surface. A diffractive pattern 58 is also shown etched on a radiused high reflective end mirror 60.

Although the DOE's can be configured as replacements for conventional optics, the flexibility of the performance of the DOE's permits new approaches to be taken in designing resonators. One principle advantage is that a DOE can be used to control the transverse mode pattern of the beam both within the cavity and exiting the cavity.

An example of a situation where this approach will be beneficial is in maximizing the $TEM_{00}$ or fundamental mode performance of the laser. It is well known that as lasers are driven to operate at higher powers, higher order modes are generated. The laser can be forced to operate in the fundamental mode if the DOE is configured to focus the beam into a gaussian intensity distribution.

DOE's can also be used for controlling the mode beam shape. It would be possible to create cavities that would favor non-gaussian modes. One application where this capability would be desirable is where the extraction of energy from the gain medium can be maximized with a non-gaussian profile.

Figure 7:
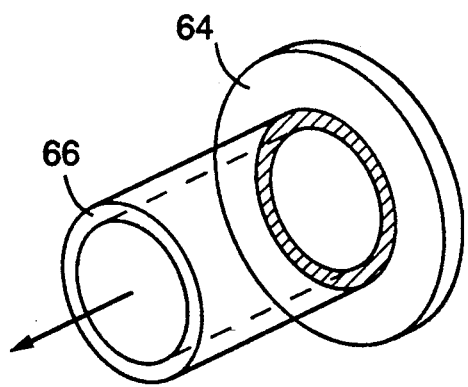
FIG. 7 is a schematic illustration of a DOE used to control the transverse mode pattern of the beam.

FIG. 7 illustrates a DOE 64 configured to create an annular beam profile 66. This shape might be desirable for use with a $CO_2$ gas laser wherein maximum gain can be extracted closer to the wall of the gas confining tube rather than down the central axis.

Figure 8:
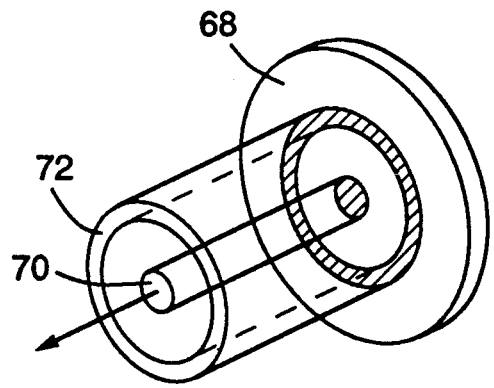
FIG. 8 is a schematic illustration of another DOE used to control the transverse mode pattern of the beam.

FIG. 8 illustrates another embodiment wherein the DOE 68 creates a mode that includes a central region 70 and an outer annulus 72. It should be noted that if the DOE's 64 or 68 of FIGS. 7 and 8 were located on the output coupler (such as in the position of DOE 24 shown in FIG. 1), the mode patterns shown in FIGS. 7 and 8 could illustrate the output of the laser. Thus, the DOE can be used to transform the shape of the internal beam having one type of mode pattern to an entirely different mode pattern as it exits the laser.

Figure 9:
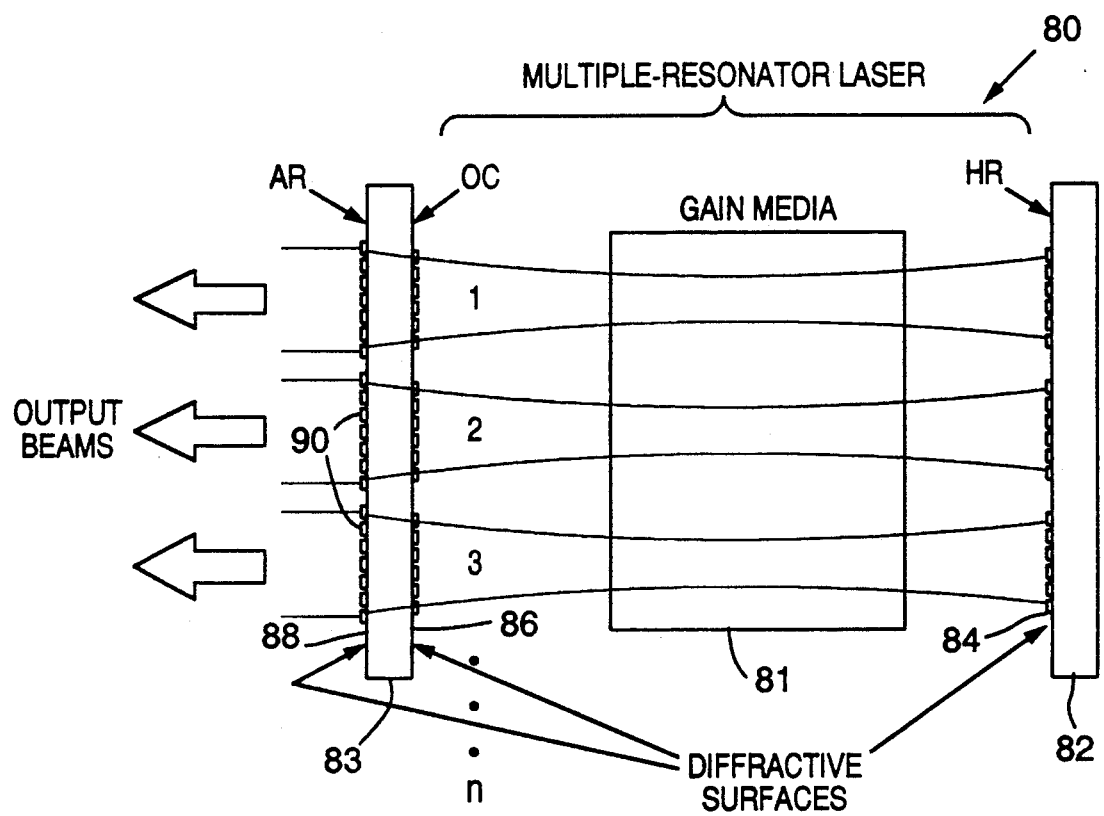
FIG. 9 is a schematic side view of a laser wherein the DOE's are used to create multiple internal resonant cavities.

Since the DOE can be fabricated with almost any profile, resonators can be designed with configurations that would be virtually impossible to achieve with conventional lens and coating technology. FIG. 9 is an illustration of a complex resonator which can be implemented with DOE technology.

Figure 10:
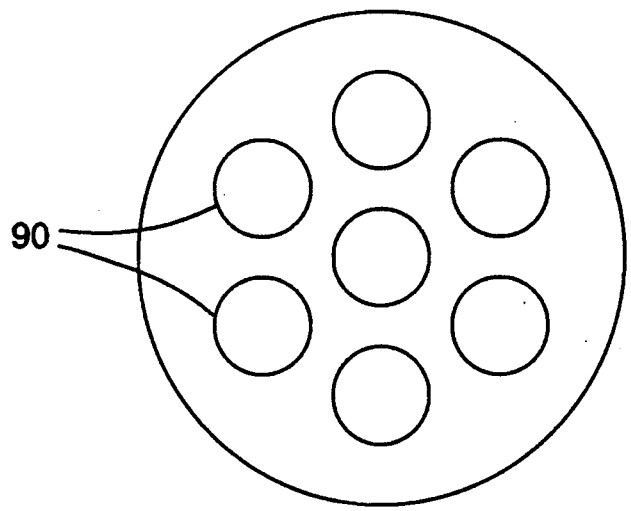
FIG. 10 is an end view of a DOE that might be used in the laser illustrated in FIG. 9.

FIG. 9 illustrates a laser 80 having a gain medium 81 located between a high reflector 82 and an output coupler 83. DOE surface 84 is provided on the high reflector and DOE's 86 and 88 on the output coupler. Each of the DOE's includes a plurality of regions 90 each having a diffractive pattern that is used to define multiple internal resonators surrounding the gain medium. FIG. 10 shows an end view of one of the DOE's. This approach can be used to generate multiple, parallel output beams.

In an other embodiment of the laser shown in FIG. 9, each of the patterned regions 90 defining the internal resonator can be further provided with wavelength selective optical coatings. Moreover, the coatings in different regions can be optimized to select different wavelengths. Thus, using a single gain medium, a multiple beam output could be generated at a plurality of wavelengths. In this embodiment, the high reflector can be a standard optic with a broad band reflective coating.

In FIG. 9, multiple beams were created within the resonant cavity and extracted from the output coupler. A properly fabricated DOE could also be used to generate a multibeam output from a single resonant beam. Such an approach is illustrated in FIG. 11 wherein a laser 92 is shown comprised of gain medium 93 and DOE 94 on the high reflector and 96 and 98 on the output coupler. The DOE elements are configured to generate a circulating beam 104 with a fundamental mode. The DOE's are further arranged so that when the beam exits the resonator, multiple beams are created. The multiple beams could be collimated or focused.

FIGS. 12 and 13 illustrate how the DOE's 88 and 98 of FIGS. 9 and 10 could be further refined to direct and focus the multiple beams to desired locations. In FIG. 12, DOE 110 is configured to inject individual beams into the end of separate optical fibers 112. Such an approach could also be envisioned for injecting multiple beams into individual waveguides.

In FIG. 13, DOE 120 has separate regions each of which has a different focal length. By this arrangement, individual beams will be focused at a different distance from the DOE allowing operation on a work piece having multiple steps or levels.

Figure 14:
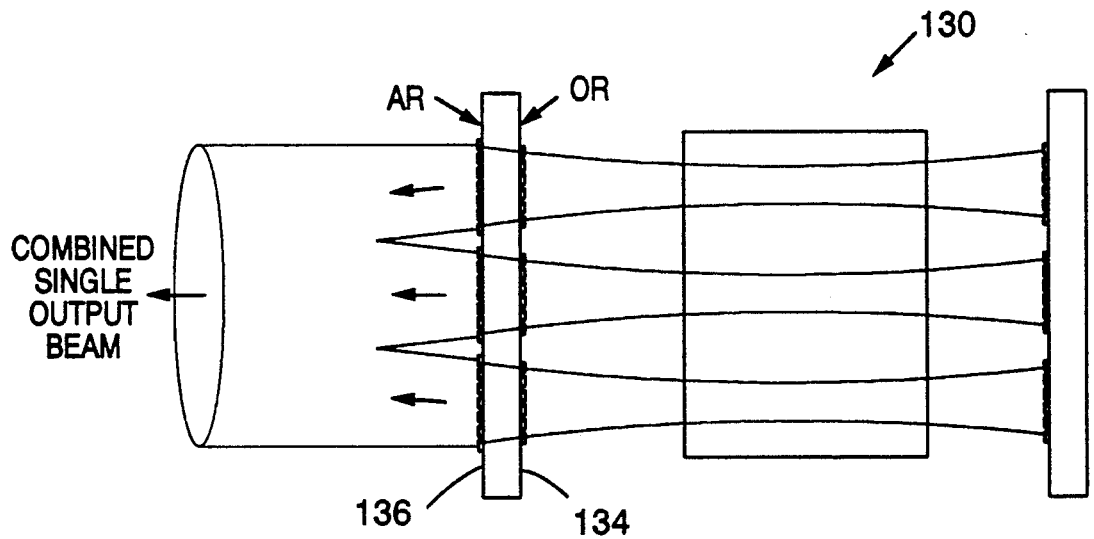
FIG. 14 is a schematic illustration of a DOE formed on an output coupler for combining multiple internal beams into a single beam.

FIG. 14 illustrates a laser 130 that is the converse of laser 94 illustrated in FIG. 11. In laser 130, DOE's 132 and 134 form a resonator similar to the one illustrated in FIG. 9 wherein multiple internal beams are defined. In this embodiment, the DOE 136 is configured to combine the multiple internal beams into one single beam. This design might be used to combine a plurality of discrete wavelength beams.

Figure 15:
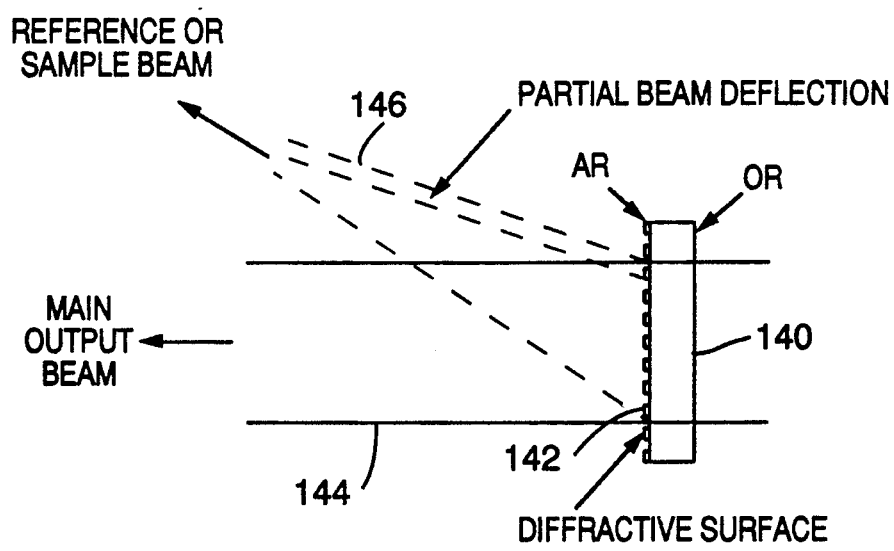
FIG. 15 is an schematic illustration of a DOE formed on an output coupler and configured to create a separate reference beam directed away from the main laser beam.

As can be appreciated, incorporating a DOE in the output coupler of a laser allows for a number of new configurations. Another possible configuration is shown in FIG. 15. In this case, the output coupler 140 is provided with a diffractive pattern 142 that functions as a light pick-off in that a small portion of the total beam is deflected out of the transmission path of the remainder of the beam 144. The secondary beam 146 could be used as a reference beam for monitoring parameters of the laser such as power or frequency.

Figure 16:
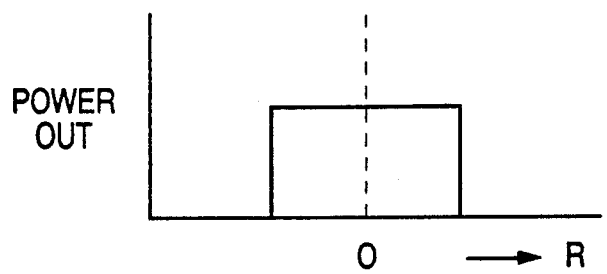
FIG. 16 is a graph illustrating a square intensity profile.

Other possible uses for a DOE at the output coupler would include configurations for reshaping the beam to a desired profile. For example, in an industrial laser, an intracavity gaussian-like profile can be reshaped at the output coupler to a square or top hat configuration so that the outer edges of the beam can generate sharp cuts in a work piece. FIG. 16 is an illustration of a beam profile having a square intensity profile.

Another possible use of a DOE at the output coupler is to collimate the output beam. This application is schematically illustrated in FIG. 1.

Figure 17:
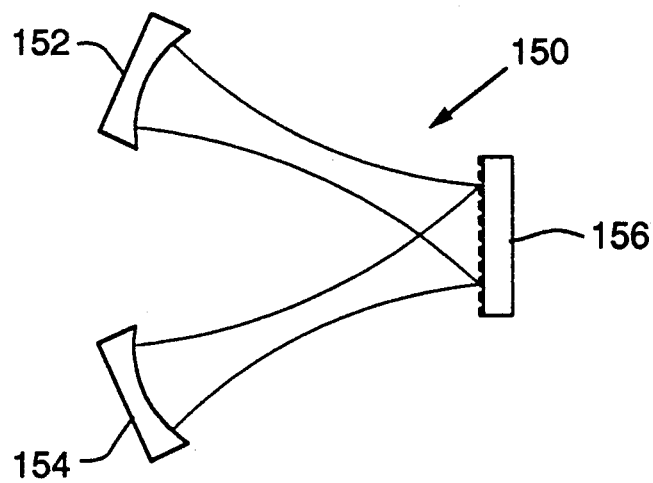
FIG. 17 illustrates how a DOE element can be used as a fold mirror within a resonant cavity.

FIG. 17 illustrates the use of a DOE optic as a separate element in a laser 150. Laser 150 has a folded cavity including two end mirrors 152 and 154. Mirror 156 is used to fold the beam. A separate DOE optic or one formed on the fold mirror can be configured to either reshape the beam or correct for any astigmatism.

Slab lasers could also benefit from reshaped internal mode structures. Slab lasers often generate unusual combinations of higher order modes. These modes could be reshaped to maximize extraction from the gain medium as well as to improve the shape of the output beam.

Figure 18:
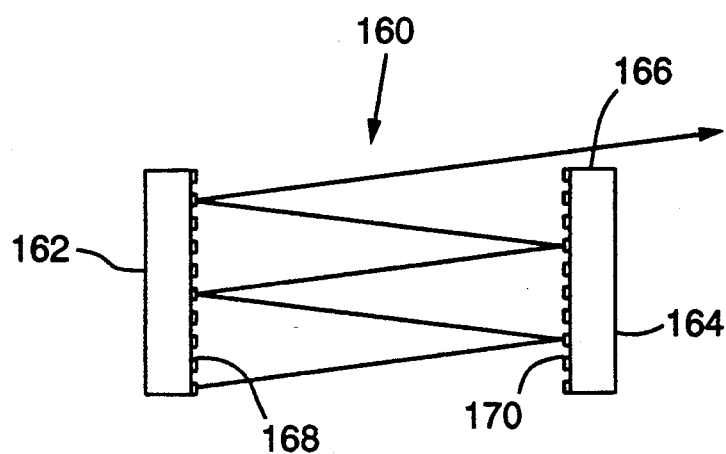
FIG. 18 is a schematic illustration of a pair of DOE elements used in a slab laser.

FIG. 18 illustrates a slab laser 160 having a pair of end mirrors 162 and 164. One problem with the output coupling scheme in this type of laser is that the knife edge 166 at the end of mirror 164 often creates unwanted diffraction effects. By proper configuration of the DOE elements 168 and 170 on the mirrors, the diffraction effects could be minimized.

Another use of a DOE element in a resonator would be to polarize either the circulating beam or the output beam. In prior art literature, there has been discussion of the need to optimize DOE surfaces to diffract both polarization states of a beam with equal efficiency. It would also be possible to design a DOE wherein the efficiency for both polarization states was deliberately different. Such a DOE could be used to force the laser to favor one polarization state over the other. In this manner, the need to insert an extra optical element inclined at Brewster's angle to polarize the beam would be eliminated.

In summary there has been disclosed a laser in which there is incorporated one or more diffractive optical elements. The DOE's can be used in place of conventional optics to save costs and allow design of resonators not heretofore possible. The ability to vary the reflectivity of the surface of a DOE in any desired pattern allows unprecedented control of both the intracavity mode as well as the mode of the output beam.

While the subject invention has been described with reference to preferred embodiments, various changes and modifications could be made therein, by one skilled in the art, without varying from the scope and spirit of the subject invention as defined by the appended claims.

We claim:

1. A laser comprising:
   a resonant cavity;
   a gain medium located within the resonant cavity;
   means for exciting the gain medium to generate a laser beam; and
   a diffractive optical element (DOE) for focusing the beam, said DOE being defined by an optical microstructure formed on a substrate, said optical microstructure for diffracting the laser beam, said DOE being located either within the resonant cavity or formed integrally with said resonant cavity such that the beam must be diffracted by the DOE before it exits the resonant cavity.

2. A laser as recited in claim 1 wherein said substrate is a radiused element for focusing the beam by refraction.

3. A laser as recited in claim 1 wherein said substrate is a radiused element for focusing the beam by reflection.

4. A laser as recited in claim 1 wherein said DOE includes a multilayer optical coating.

5. A laser as recited in claim 4 wherein said optical coating functions as an anti-reflective coating.

6. A laser as recited in claim 4 wherein said optical coating functions as a wavelength selective coating.

7. A laser as recited in claim 1 wherein said DOE is configured to control the shape of the transverse mode of the laser beam circulating in the resonant cavity.

8. A laser as recited in claim 7 wherein the shape of the transverse mode is configured to best match the excited mode volume in the gain medium.

9. A laser as recited in claim 7 wherein the shape of the intracavity mode is annular.

10. A laser as recited in claim 1 wherein said DOE includes zones configured to define multiple independent resonant cavities.

11. A laser as recited in claim 10 wherein said each of said zones further include wavelength selective coatings.

12. A laser as recited in claim 11 wherein the wavelength coatings associated with each different zone are configured to select the same wavelength.

13. A laser as recited in claim 11 wherein the wavelength coatings associated with each different zone are configured to select a different wavelength.

14. A laser as recited in claim 1 wherein said DOE is configured to control the shape of the transverse mode of the laser beam exiting the resonant cavity.

15. A laser as recited in claim 14 wherein said DOE is configured so that a portion of the beam exiting the resonant cavity is redirected away from the path of the main beam.

16. A laser as recited in claim 14 wherein said DOE is configured to split the beam into multiple beams.

17. A laser as recited in claim 14 wherein said DOE is configured to create an output beam with a square intensity profile.

18. A laser as recited in claim 14 wherein said DOE is configured to collimate the output beam of the laser.

19. A laser as recited in claim 1 wherein said resonant cavity includes at least two end mirrors including a high reflector and an output coupler and said DOE is formed integrally with one of said end mirrors.

20. A laser as recited in claim 1 wherein said DOE is formed integrally on said gain medium.

21. A laser as recited in claim 1 wherein said DOE is formed on a separate optical element within said resonant cavity.

22. A laser as recited in claim 1 wherein said DOE is configured to effect the polarization state of the laser beam.

23. A laser as recited in claim 19 wherein said laser is a slab laser and said DOE is configured to reduce diffraction effects from the edge of the output coupler.

24. A laser as recited in claim 1 wherein said resonant cavity is folded and includes at least two end mirrors and an intermediate fold mirror, and wherein said DOE is configured to vary the shape of the beam.

25. A laser as recited in claim 24 wherein said DOE is located on said fold mirror.

26. A laser as recited in claim 24 wherein said DOE is configured to correct for astigmatism in the beam.

* * * * *